(12) United States Patent
Knussman et al.

(10) Patent No.: US 8,910,474 B2
(45) Date of Patent: Dec. 16, 2014

(54) HYDRAULIC SYSTEM

(75) Inventors: Michael L. Knussman, East Peoria, IL (US); Brad A. Edler, Waterloo, IL (US); Patrick Opdenbosch, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 615 days.

(21) Appl. No.: 13/278,895

(22) Filed: Oct. 21, 2011

(65) Prior Publication Data

US 2013/0098024 A1 Apr. 25, 2013

(51) Int. Cl.
*F15B 15/02* (2006.01)
*F15B 7/00* (2006.01)
*F15B 11/17* (2006.01)
*E02F 9/22* (2006.01)

(52) U.S. Cl.
CPC ......... *F15B 7/001* (2013.01); *F15B 2211/7142* (2013.01); *F15B 2211/785* (2013.01); *F15B 7/006* (2013.01); *F15B 7/003* (2013.01); *F15B 11/17* (2013.01); *E02F 9/2296* (2013.01); *E02F 9/2292* (2013.01); *E02F 9/2242* (2013.01); *F15B 2211/30575* (2013.01); *F15B 2211/20546* (2013.01); *F15B 2211/613* (2013.01); *E02F 9/2289* (2013.01); *F15B 2211/30595* (2013.01); *F15B 2211/20576* (2013.01); *F15B 2211/6346* (2013.01)
USPC .............................................. 60/422; 60/421

(58) Field of Classification Search
CPC .......... F15B 11/17; F15B 7/003; F15B 7/006; F15B 2211/613; F15B 2211/30595; F15B 2211/20576; F15B 2211/20546; F15B 2211/6346
USPC .................................. 60/420, 421, 422, 486
See application file for complete search history.

(56) References Cited

U.S. PATENT DOCUMENTS 4,369,625 A * 1/1983 Izumi et al. ..................... 60/327
4,376,371 A 3/1983 Kojima et al.

(Continued)

FOREIGN PATENT DOCUMENTS

EP 1 598 561 11/2005
GB 2 269 425 2/1994

(Continued)

OTHER PUBLICATIONS

Linjama, M., entitled "Digital Fluid Power-State of the Art", The 12th Scandinavian International Conference on Fluid Power, Tampere, Finland (May 18-20, 2011).

(Continued)

*Primary Examiner* — Thomas E Lazo
(74) *Attorney, Agent, or Firm* — Finnegan, Henderson, Farabow, Garrett & Dunner LLP

(57) ABSTRACT

A hydraulic system includes a first pump, a first actuator fluidly connected to the first pump via a first closed-loop circuit, a second pump, and a second actuator fluidly connected to the second pump via a second closed-loop circuit. The system also includes a third pump, a third actuator fluidly connected to the third pump via a third closed-loop circuit, a fourth pump, and a fourth actuator fluidly connected to the fourth pump via a fourth closed-loop circuit. The system further includes a first combining valve configured to combine fluid from the first and second circuits, a second combining valve configured to combine fluid from the second and third circuits, and a third combining valve configured to combine fluid from the third and fourth circuits. The system also includes a fourth combining valve configured to combine fluid from the first and fourth circuits.

20 Claims, 2 Drawing Sheets

(56) References Cited

U.S. PATENT DOCUMENTS

| | | |
|---|---|---|
| 4,449,366 A | 5/1984 | Sato et al. |
| 4,561,249 A | 12/1985 | Watanabe et al. |
| 4,586,330 A | 5/1986 | Watanabe et al. |
| 4,768,339 A | 9/1988 | Aoyagi et al. |
| 4,833,798 A | 5/1989 | Ehrich |
| 5,048,293 A | 9/1991 | Aoyagi |
| 5,329,767 A | 7/1994 | Hewett |
| 6,330,797 B1 | 12/2001 | Kondo |
| 6,745,992 B2 | 6/2004 | Yang et al. |
| 6,789,335 B1 | 9/2004 | Kinugawa et al. |
| 6,918,247 B1 | 7/2005 | Warner |
| 6,962,050 B2 | 11/2005 | Hiraki et al. |
| 7,243,591 B2 | 7/2007 | Dixen et al. |
| 7,260,931 B2 | 8/2007 | Egelja et al. |
| 7,272,928 B2 | 9/2007 | Ariga et al. |
| 7,412,827 B2 | 8/2008 | Verkuilen |
| 7,434,391 B2 | 10/2008 | Asam et al. |
| 7,490,421 B1 | 2/2009 | Pletzer et al. |
| 7,516,613 B2 | 4/2009 | Kadlicko |
| 2004/0083629 A1 | 5/2004 | Kondou |
| 2004/0123499 A1 | 7/2004 | Arii |
| 2005/0012337 A1 | 1/2005 | Yoshimatsu |
| 2005/0036894 A1 | 2/2005 | Oguri |
| 2007/0044463 A1 | 3/2007 | VerKuilen et al. |
| 2007/0062186 A1 | 3/2007 | Wuthrich et al. |
| 2008/0250783 A1 | 10/2008 | Griswold |
| 2008/0300757 A1 | 12/2008 | Kanayama et al. |
| 2008/0314038 A1 | 12/2008 | Tozawa et al. |
| 2009/0165450 A1 | 7/2009 | Cherney et al. |
| 2009/0288408 A1 | 11/2009 | Tozawa et al. |
| 2010/0000209 A1 | 1/2010 | Wada et al. |
| 2010/0000211 A1 | 1/2010 | Ikeda et al. |
| 2010/0043420 A1 | 2/2010 | Ikeda et al. |
| 2010/0107620 A1 | 5/2010 | Nelson et al. |
| 2010/0115936 A1 | 5/2010 | Williamson et al. |
| 2010/0162593 A1 | 7/2010 | Hughes, IV et al. |
| 2010/0162885 A1 | 7/2010 | Hughes, IV et al. |
| 2010/0163258 A1 | 7/2010 | Hughes, IV et al. |
| 2010/0218493 A1 | 9/2010 | Nakamura et al. |
| 2011/0029206 A1 | 2/2011 | Kang et al. |
| 2011/0030364 A1 | 2/2011 | Persson et al. |

FOREIGN PATENT DOCUMENTS

| | | |
|---|---|---|
| JP | 56-016735 | 2/1981 |
| JP | 57-133941 A | 8/1982 |
| JP | 57-134007 | 8/1982 |
| JP | 58-044133 | 3/1983 |
| JP | 02-108733 | 4/1990 |
| JP | 06-057786 | 3/1994 |
| JP | 10-96402 | 4/1998 |
| JP | 2006-118685 | 5/2006 |
| JP | 2007-247701 | 9/2007 |
| JP | 2011-069432 | 4/2011 |
| WO | WO 2005/024246 | 3/2005 |
| WO | WO 2009/084853 | 7/2009 |
| WO | WO 2009/123047 | 10/2009 |
| WO | WO 2010/040890 | 4/2010 |
| WO | WO 2011/041410 | 4/2011 |

OTHER PUBLICATIONS

Zimmerman, J. PhD Student/Purdue University, Center for Compact and Efficient Fluid Power PowerPoint Presentation, 2010 Annual Meeting (Jun. 14).

Zimmerman, J. et al., entitled "Hybrid Displacement Controlled Multi-Actuator Hydraulic Systems", The Twelfth Scandinavian International Conference on Fluid Power, Tampere, Finland (May 18-20, 2011).

Linde Hydraulics Brochure entitled "HPV-02. Variable Pumps for Closed Loop Operation", pp. 1-36.

Brezonick, M., entitled "The Potential of Pump-Controlled Hydraulics", Hydraulic Horizons, Diesel Progress North American Edition (Jan. 2009).

Zick, J., entitled "Verbesserte Leistungsausnutzung bei Erdbaumaschinen durch optimal Pumpensteuerung", Olhydraulic und pneumatic 20 (1976) Nr. 4.

U.S. Appl. No. 13/222,895 by Patrick Opdenbosch et al., entitled "Meterless Hydraulic System Having Displacement Control Valve" filed Aug. 31, 2011.

U.S. Appl. No. 13/222,945 by Patrick Opdenbosch et al., entitled "Meterless Hydraulic System Having Restricted Primary Makeup" filed Aug. 31, 2011.

U.S. Appl. No. 13/222,990 by Patrick Opdenbosch et al., entitled "Meterless Hydraulic System Having Load-Holding Bypass" filed Aug. 31, 2011.

U.S. Appl. No. 13/249,932 by Bryan E. Nelson et al., entitled "Regeneration Configuration for Closed-Loop Hydraulic Systems" filed Sep. 30, 2011.

U.S. Appl. No. 13/250,067 by Patrick Opdenbosch, entitled "Meterless Hydraulic System Having Multi-Actuator Circuit" filed Sep. 30, 2011.

U.S. Appl. No. 13/250,250 by Patrick Opdenbosch, entitled "Meterless Hydraulic System Having Multi-Actuator Circuit" filed Sep. 30, 2011.

U.S. Appl. No. 13/250,002 by Michael L. Knussman, entitled "Closed-Loop Hydraulic System Having Energy Recovery" filed Sep. 30, 2011.

U.S. Appl. No. 13/250,171 of Patrick Opdenbosch, entitled "Meterless Hydraulic System Having Pump Protection" filed Sep. 30, 2011.

U.S. Appl. No. 13/278,720 of Patrick Opdenbosch, entitled "Meterless Hydraulic System Having Multi-Circuit Recuperation" filed on Oct. 21, 2011.

U.S. Appl. No. 13/278,623 of Patrick Opdenbosch, entitled "Closed-Loop Hydraulic System Having Flow Combining and Recuperation" filed on Oct. 21, 2011.

U.S. Appl. No. 13/278,924 of Patrick Opdenbosch et al., entitled "Meterless Hydraulic System Having Flow Sharing and Combining Functionality" filed on Oct. 21, 2011.

U.S. Appl. No. 13/279,064 of Patrick Opdenbosch et al., entitled "Meterless Hydraulic System Having Flow Sharing and Combining Functionality" filed on Oct. 21, 2011.

U.S. Appl. No. 13/279,177 of Patrick Opdenbosch et al., entitled "Meterless Hydraulic System Having Flow Sharing and Combining Functionality" filed on Oct. 21, 2011.

U.S. Appl. No. 13/278,556 of Michael L. Knussman, entitled "Closed-Loop Hydraulic System Having Regeneration Configuration" filed on Oct. 21, 2011.

U.S. Appl. No. 13/278,894 of Patrick Opdenbosch, entitled "Hydraulic System Having Flow Combining Capabilities" filed on Oct. 21, 2011.

U.S. Appl. No. 13/278,939 of Michael L. Knussman, entitled "Hydraulic System" filed on Oct. 21, 2011.

U.S. Appl. No. 13/278,745 of Brad A. Edler et al., entitled "Closed-Loop System Having Multi-Circuit Flow Sharing" filed on Oct. 21, 2011.

U.S. Appl. No. 13/278,650 of Michael L. Knussman, entitled "Hydraulic System Having Multiple Closed-Loop Circuits" filed on Oct. 21, 2011.

U.S. Appl. No. 13/278,479 of Brad A. Edler et al., entitled "Closed-Loop Hydraulic System Having Priority-Based Sharing" filed on Oct. 21, 2011.

U.S. Appl. No. 13/278,589 of Michael L. Knussman, entitled "Hydraulic System Having Multiple Closed-Loop Circuits" filed on Oct. 21, 2011.

U.S. Appl. No. 13/278,788 of Jeffrey L. Kuehn et al., entitled "Closed-Loop Hydraulic System Having Force Modulation" filed on Oct. 21, 2011.

U.S. Appl. No. 13/278,491 of Jeffrey L. Kuehn et al., entitled "Meterless Hydraulic System Having Sharing and Combining Functionality" filed on Oct. 21, 2011.

U.S. Appl. No. 13/278,935 of Michael L. Knussman et al., entitled "Hydraulic System" filed on Oct. 21, 2011.

* cited by examiner

HYDRAULIC SYSTEM

TECHNICAL FIELD

The present disclosure relates generally to a hydraulic system and, more particularly, to a hydraulic system having flow combining capabilities.

BACKGROUND

A conventional hydraulic system includes a pump that draws low-pressure fluid from a tank, pressurizes the fluid, and makes the pressurized fluid available to multiple different actuators for use in moving the actuators. In this arrangement, a speed of each actuator can be independently controlled by selectively throttling (i.e., restricting) a flow of the pressurized fluid from the pump into each actuator. For example, to move a particular actuator at a high speed, the flow of fluid from the pump into the actuator is restricted by only a small amount. In contrast, to move the same or another actuator at a low speed, the restriction placed on the flow of fluid is increased. Although adequate for many applications, the use of fluid restriction to control actuator speed can result in pressure losses that reduce an overall efficiency of a hydraulic system.

An alternative type of hydraulic system is known as a meterless hydraulic system. A meterless hydraulic system generally includes a pump connected in closed-loop fashion to a single actuator or to a pair of actuators operating in tandem. During operation, the pump draws fluid from one chamber of the actuator(s) and discharges pressurized fluid to an opposing chamber of the same actuator(s). To move the actuator(s) at a higher speed, the pump discharges fluid at a faster rate. To move the actuator with a lower speed, the pump discharges the fluid at a slower rate. A meterless hydraulic system is generally more efficient than a conventional hydraulic system because the speed of the actuator(s) is controlled through pump operation as opposed to fluid restriction. That is, the pump is controlled to only discharge as much fluid as is necessary to move the actuator(s) at a desired speed, and no throttling of a fluid flow is required.

An exemplary meterless hydraulic system is disclosed in U.S. Pat. No. 4,369,625 to Izumi et al. ("the '625 patent"). The '625 patent describes a multi-actuator meterless hydraulic system having flow combining functionality. The hydraulic system of the '625 patent includes a swing circuit, a boom circuit, a stick circuit, a bucket circuit, a left travel circuit, and a right travel circuit. Each of the swing, boom, stick, and bucket circuits have a pump connected to a specialized actuator in a closed-loop manner. In addition, a first combining valve is connected between the swing and stick circuits, a second combining valve is connected between the stick and boom circuits, and a third combining valve is connected between the bucket and boom circuits. The left and right travel circuits are connected in parallel to the pumps of the bucket and boom circuits, respectively. In this configuration, any one actuator can receive pressurized fluid from more than one pump.

Although an improvement over existing meterless hydraulic systems, the functionality of the meterless hydraulic system disclosed in the '625 patent is limited. In particular, none of the individual circuit pumps are capable of providing fluid to more than one actuator simultaneously. Thus, operation of connected circuits of the system may only be sequentially performed. For example, when the stick is operating in a high load condition, the first combining valve may temporarily combine fluid provided to the stick by the stick circuit with supplemental fluid from the swing circuit. While such a combined flow may assist in meeting stick demand, the system is not capable of operating both the stick circuit and the swing circuit simultaneously while providing the combined flow to the stick. As a result, operation of the hydraulic system disclosed in the '625 patent may be limited in certain situations.

In addition, the speeds and forces of the various actuators may be difficult to control. For example, the hydraulic system of the '625 patent employs fixed displacement motors in the left and right travel circuits, as well as the swing circuit. These motors are only capable of operating at speeds and rotation directions determined by the corresponding pumps of the bucket, boom, and swing circuits, respectively. Such a configuration does not permit the speed and/or rotation direction of these actuators to be changed unless the displacement and/or rotation direction of the associated pumps is also changed. Controlling the actuators in this way may be difficult and/or undesirable in certain applications.

The hydraulic system of the present disclosure is directed toward solving one or more of the problems set forth above and/or other problems of the prior art.

SUMMARY

In an exemplary embodiment of the present disclosure, a hydraulic system includes a variable displacement first pump, a first actuator fluidly connected to the first pump via a first closed-loop circuit, a variable displacement second pump, and a second actuator fluidly connected to the second pump via a second closed-loop circuit. The system also includes a variable displacement third pump, a third actuator fluidly connected to the third pump via a third closed-loop circuit, a variable displacement fourth pump, and a fourth actuator fluidly connected to the fourth pump via a fourth closed-loop circuit. The system further includes a first combining valve configured to selectively combine fluid from the first and second circuits, a second combining valve configured to selectively combine fluid from the second and third circuits, and a third combining valve configured to selectively combine fluid from the third and fourth circuits. The system also includes a fourth combining valve configured to selectively combine fluid from the first and fourth circuits.

In another exemplary embodiment of the present disclosure, a hydraulic system includes a variable displacement first pump, first and second linear actuators associated with a machine boom, the first and second linear actuators being fluidly connected to the first pump via a first closed-loop circuit, a variable displacement second pump, and a first travel motor associated with a first traction device of the machine, the first travel motor being fluidly connected to the second pump via a second closed-loop circuit. The system also includes a variable displacement third pump, a second travel motor associated with a second traction device of the machine, the second travel motor being fluidly connected to the third pump via a third closed-loop circuit, a variable displacement fourth pump, and a third linear actuator associated with a machine stick, the third linear actuator being fluidly connected to the fourth pump via a fourth closed loop circuit. The system further includes a first combining valve configured to selectively combine fluid from the first and second circuits, a second combining valve configured to selectively combine fluid from the second and third circuits, and a third combining valve configured to selectively combine fluid from the third and fourth circuits. The system also includes a fourth combining valve configured to selectively combine fluid from the first and fourth circuits. The first, second, and third linear actuators are configured to operate simultaneously while fluid from the first and fourth circuits is combined.

DETAILED DESCRIPTION

Figure 1:
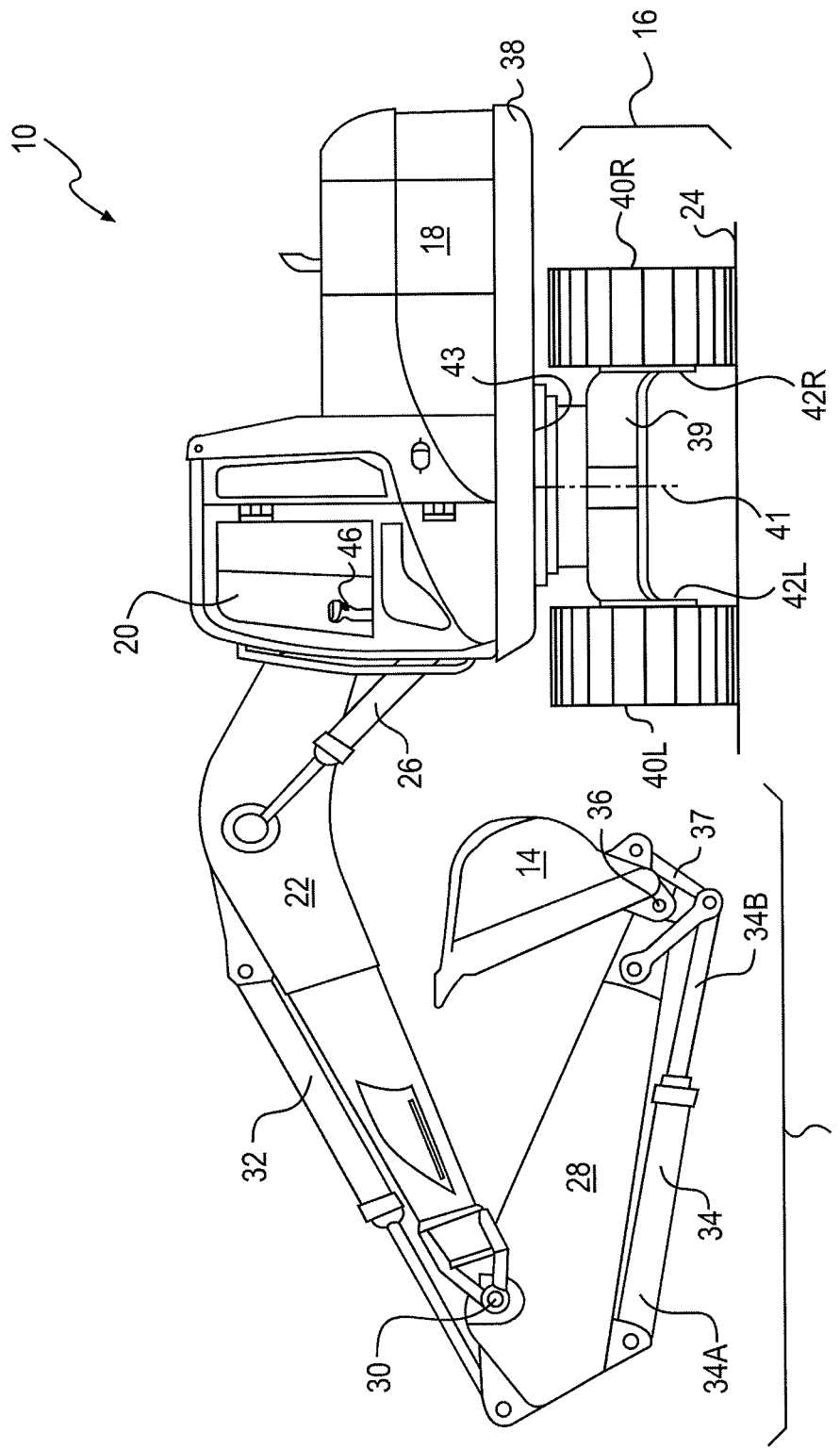
FIG. 1 is a pictorial illustration of an exemplary machine.

FIG. 1 illustrates an exemplary machine 10 having multiple systems and components that cooperate to accomplish a task. Machine 10 may embody a fixed or mobile machine that performs some type of operation associated with an industry such as mining, construction, farming, transportation, or another industry known in the art. For example, machine 10 may be an earth moving machine such as an excavator (shown in FIG. 1), a dozer, a loader, a backhoe, a motor grader, a dump truck, or any other earth moving machine. Machine 10 may include an implement system 12 configured to move a work tool 14, a drive system 16 for propelling machine 10, a power source 18 that provides power to implement system 12 and drive system 16, and an operator station 20 situated for manual control of implement system 12, drive system 16, and/or power source 18.

Implement system 12 may include a linkage structure acted on by fluid actuators to move work tool 14. Specifically, implement system 12 may include a boom 22 that is vertically pivotal about a horizontal axis (not shown) relative to a work surface 24 by a pair of adjacent, double-acting, hydraulic cylinders 26 (only one shown in FIG. 1). Implement system 12 may also include a stick 28 that is vertically pivotal about a horizontal axis 30 by a single, double-acting, hydraulic cylinder 32. Implement system 12 may further include a single, double-acting, hydraulic cylinder 34 that is operatively connected between stick 28 and work tool 14 to pivot work tool 14 vertically about a horizontal pivot axis 36. In the disclosed embodiment, hydraulic cylinder 34 is connected at a head-end 34A to a portion of stick 28 and at an opposing rod-end 34B to work tool 14 by way of a power link 37. Boom 22 may be pivotally connected to a body 38 of machine 10. Body 38 may be pivotally connected to an undercarriage 39 and movable about a vertical axis 41 by a hydraulic swing motor 43. Stick 28 may pivotally connect boom 22 to work tool 14 by way of axis 30 and 36.

Numerous different work tools 14 may be attachable to a single machine 10 and operator controllable. Work tool 14 may include any device used to perform a particular task such as, for example, a bucket, a fork arrangement, a blade, a shovel, a ripper, a dump bed, a broom, a snow blower, a propelling device, a cutting device, a grasping device, or any other task-performing device known in the art. Although connected in the embodiment of FIG. 1 to pivot in the vertical direction relative to body 38 of machine 10 and to swing in the horizontal direction, work tool 14 may alternatively or additionally rotate, slide, open and close, or move in any other manner known in the art.

Drive system 16 may include one or more traction devices powered to propel machine 10. In the disclosed example, drive system 16 includes a left track 40L located on one side of machine 10, and a right track 40R located on an opposing side of machine 10. Left track 40L may be driven by a left travel motor 42L, while right track 40R may be driven by a right travel motor 42R. It is contemplated that drive system 16 could alternatively include traction devices other than tracks such as, wheels, belts, or other known traction devices. Machine 10 may be steered by generating a speed and/or rotational direction difference between left and right travel motors 42L, 42R, while straight travel may be facilitated by generating substantially equal output speeds and rotational directions from left and right travel motors 42L, 42R.

Power source 18 may embody an engine such as, for example, a diesel engine, a gasoline engine, a gaseous fuel-powered engine, or any other type of combustion engine known in the art. It is contemplated that power source 18 may alternatively embody a non-combustion source of power such as a fuel cell, a power storage device, or another source known in the art. Power source 18 may produce a mechanical or electrical power output that may then be converted to hydraulic power for moving hydraulic cylinders 26, 32, 34, left and right travel motors 42L, 42R, and swing motor 43.

Operator station 20 may include devices that receive input from a machine operator indicative of desired machine maneuvering. Specifically, operator station 20 may include one or more operator interface devices 46, for example a joystick, a steering wheel, and/or a pedal, that are located proximate an operator seat (not shown). Operator interface devices 46 may initiate movement of machine 10, for example travel and/or tool movement, by producing displacement signals that are indicative of desired machine maneuvering. As an operator moves interface device 46, the operator may affect a corresponding machine movement in a desired direction, with a desired speed, and/or with a desired force.

Figure 2:
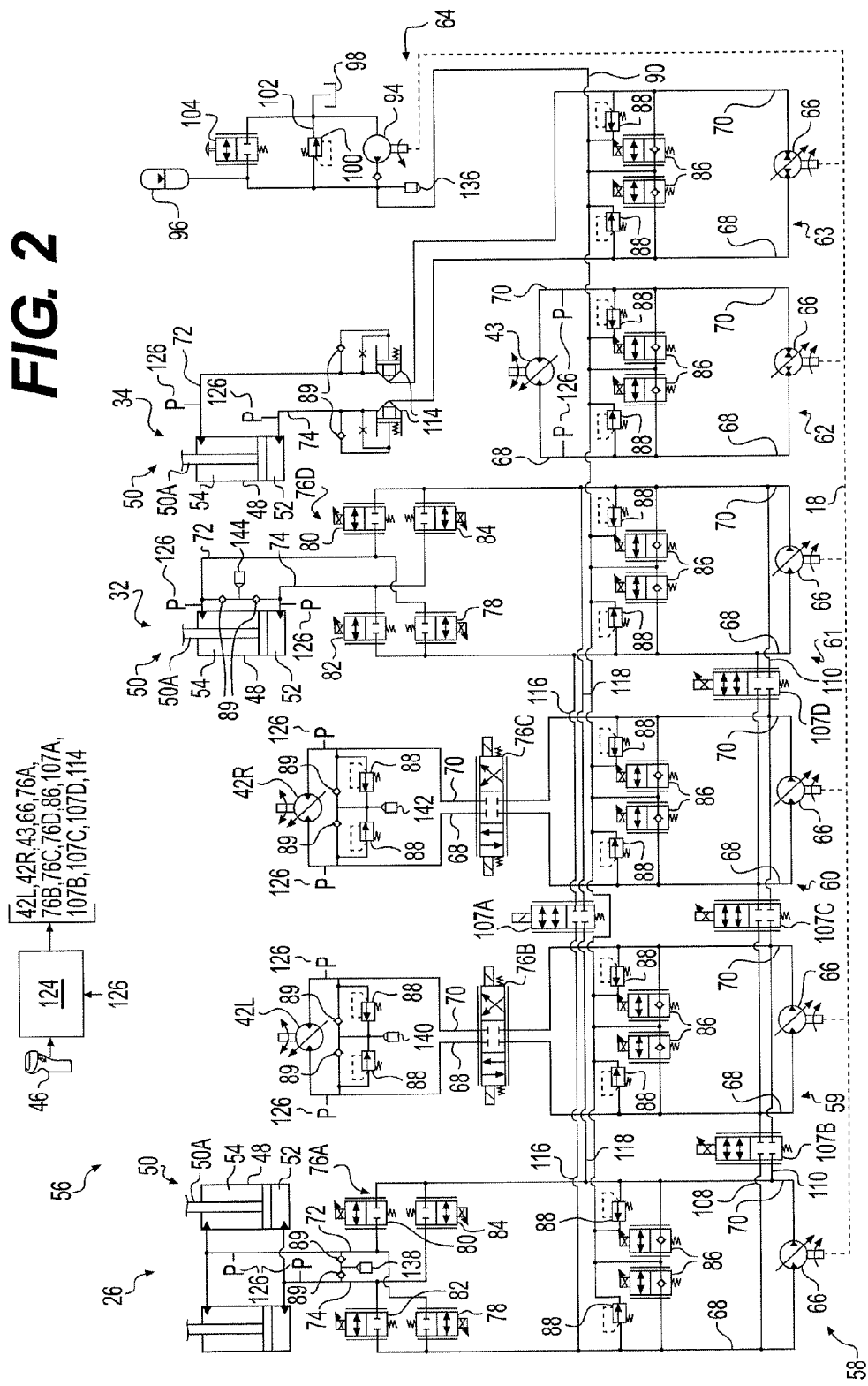
FIG. 2 is a schematic illustration of an exemplary hydraulic system that may be used in conjunction with the machine of FIG. 1.

As shown schematically in FIG. 2, hydraulic cylinders 26, 32, 34 may comprise any type of linear actuator known in the art. Each hydraulic cylinder 26, 32, 34 may include a tube 48 and a piston assembly 50 arranged within tube 48 to form a first chamber 52 and an opposing second chamber 54. In one example, a rod portion 50A of piston assembly 50 may extend through an end of second chamber 54. As such, second chamber 54 may be considered the rod-end chamber of hydraulic cylinders 26, 32, 34, while first chamber 52 may be considered the head-end chamber.

First and second chambers 52, 54 may each be selectively provided with pressurized fluid and drained of the pressurized fluid to cause piston assembly 50 to move within tube 48, thereby changing an effective length of hydraulic cylinders 26, 32, 34, and moving boom 22, stick 28 and/or work tool 14 (referring to FIG. 1). A flow rate of fluid into and out of first and second chambers 52, 54 may relate to a translational velocity of hydraulic cylinders 26, 32, 34, while a pressure differential between first and second chambers 52, 54 may relate to a force imparted by hydraulic cylinders 26, 32, 34 on the associated linkage structure of implement system 12.

Swing motor 43, like hydraulic cylinders 26, 32, 34, may be driven by a fluid pressure differential. Specifically, swing motor 43 may include first and second chambers (not shown) located to either side of a pumping mechanism such as an impeller, plunger, or series of pistons (not shown). When the first chamber is filled with pressurized fluid and the second chamber is drained of fluid, the pumping mechanism may be urged to move or rotate in a first direction. Conversely, when the first chamber is drained of fluid and the second chamber is filled with pressurized fluid, the pumping mechanism may be urged to move or rotate in an opposite direction. The flow rate of fluid into and out of the first and second chambers may determine an output velocity of swing motor 43, while a pressure differential across the pumping mechanism may determine an output torque. It is contemplated that a displacement of swing motor 43 may be variable, if desired, such that for a given flow rate and/or pressure of supplied fluid, a speed and/or torque output of swing motor 43 may be adjusted.

Similar to swing motor 43, each of left and right travel motors 42L, 42R may be driven by creating a fluid pressure differential. Specifically, each of left and right travel motors 42L, 42R may include first and second chambers (not shown) located to either side of a pumping mechanism (not shown). When the first chamber is filled with pressurized fluid and the second chamber is drained of fluid, the pumping mechanism may be urged to move or rotate a corresponding traction device (40L, 40R) in a first direction. Conversely, when the first chamber is drained of the fluid and the second chamber is filled with the pressurized fluid, the respective pumping mechanism may be urged to move or rotate the traction device in an opposite direction. The flow rate of fluid into and out of the first and second chambers may determine a velocity of left and right travel motors 42L, 42R, while a pressure differential between left and right travel motors 42L, 42R may determine a torque. It is contemplated that a displacement of left and right travel motors 42L, 42R may be variable, if desired, such that for a given flow rate and/or pressure of supplied fluid, a velocity and/or torque output of travel motors 42L, 42R may be adjusted. In additional exemplary embodiments, one or more of the swing motor 43, left travel motor 42L, and right travel motor 42R may be an overcenter-type motor. It is understood that in such exemplary embodiments, additional controls and/or load-holding equipment may be necessary when changing displacement direction.

As illustrated in FIG. 2, machine 10 may include a hydraulic system 56 having a plurality of fluid components that cooperate to move work tool 14 (referring to FIG. 1) and machine 10. In particular, hydraulic system 56 may include, among other things, a first hydraulic circuit 58, a second hydraulic circuit 59, a third hydraulic circuit 60, a fourth hydraulic circuit 61, a fifth hydraulic circuit 62, a sixth hydraulic circuit 63, and a charge circuit 64 selectively fluidly connected to each of the circuits 58, 59, 60, 61, 62, 63. Hydraulic circuit 58 may be a boom circuit associated with hydraulic cylinders 26. Hydraulic circuit 59 may be a left travel circuit associated with left travel motor 42L. Hydraulic circuit 60 may be a right travel circuit associated with right travel motor 42R. Hydraulic circuit 61 may be a stick circuit associated with hydraulic cylinder 32. Hydraulic circuit 62 may be a swing circuit associate with swing motor 43. Hydraulic circuit 63 may be a bucket circuit associated with hydraulic cylinder 34. It is contemplated that additional and/or different configurations of circuits may be included within hydraulic system 56, such as configurations in which two or more of the disclosed actuators may be fluidly connected to the same hydraulic circuit. In addition, in exemplary embodiments, one or more of the circuits 58, 59, 60, 61, 62, 63 may be meterless circuits.

In the disclosed embodiment, each of the hydraulic circuits 58, 59, 60, 61, 62, 63 may include a plurality of interconnecting and cooperating fluid components that facilitate the simultaneous and independent use and control of the associated actuators. For example, each circuit 58, 59, 60, 61, 62, 63 may include a pump 66 fluidly connected to its associated rotary and/or linear actuator via a closed-loop formed by opposing passages. Specifically, each pump 66 may be connected to its rotary actuator (e.g., to left-travel motor 42L, right travel motor 42R, or swing motor 43) via a first pump passage 68 and a second pump passage 70. In addition, each pump 66 may be connected to its linear actuator (e.g., to hydraulic cylinder 26, 32, or 34) via first and second pump passages 68, 70, a rod-end passage 72, and a head-end passage 74. To cause the rotary actuator to rotate in a first direction, first pump passage 68 may be filled with fluid pressurized by pump 66, while second pump passage 70 may be filled with fluid exiting the rotary actuator. To reverse direction of the rotary actuator, second pump passage 70 may be filled with fluid pressurized by pump 66, while first pump passage 68 may be filled with fluid exiting the rotary actuator. During an extending operation of a particular linear actuator, head-end passage 74 may be filled with fluid pressurized by pump 66, while rod-end passage 72 may be filled with fluid returned from the linear actuator. In contrast, during a retracting operation, rod-end passage 72 may be filled with fluid pressurized by pump 66, while head-end passage 74 may be filled with fluid returned from the linear actuator. As will be described in greater detail below, in additional exemplary embodiments, the flow direction of fluid entering and exiting pump 66 may remain constant while a travel direction of the actuators may be switched using associated valves.

Each pump 66 may have a variable displacement and may be controlled to draw fluid from its associated actuators and discharge the fluid at a specified elevated pressure back to the actuators. In exemplary embodiments, one or more of the pumps 66 may include a displacement controller (not shown) such as a swashplate and/or other like stroke-adjusting mechanism. The position of various components of the displacement controller may be electro-hydraulically and/or hydro-mechanically adjusted based on, among other things, a demand, desired speed, desired torque, and/or load of one or more of the actuators to thereby change a displacement (e.g., a discharge rate) of pump 66. In exemplary embodiments, the displacement controller may change the displacement of pump 66 in response to a combined demand of one or more of left-travel motor 42L, right travel motor 42R, swing motor 43, and hydraulic cylinders 26, 32, 34. The displacement of pump 66 may be varied from a zero displacement position at which substantially no fluid is discharged from pump 66, to a maximum displacement position in a first direction at which fluid is discharged from pump 66 at a maximum rate into first pump passage 68. Likewise, the displacement of pump 66 may be varied from the zero displacement position to a maximum displacement position in a second direction at which fluid is discharged from pump 66 at a maximum rate into second pump passage 70. In such exemplary embodiments, pump 66 may be configured to draw in and discharge fluid in two directions. Although FIG. 2 illustrates unidirectional pumps 66 associated with hydraulic circuits 58, 59, 60, 61 and bidirectional pumps 66 associated with hydraulic circuits 62, 63, in additional exemplary embodiments, any combination of unidirectional and bidirectional pumps 66 may be included in hydraulic system 56. In addition, it is understood that one or more of pumps 66 may be an overcenter-type pump.

Pump 66 may be drivably connected to power source 18 of machine 10 by, for example, a countershaft, a belt, or in another suitable manner. Alternatively, pump 66 may be indirectly connected to power source 18 via a torque converter, a gear box, an electrical circuit, or in any other manner known in the art. It is contemplated that pumps 66 of different circuits may be connected to power source 18 in tandem (e.g., via the same shaft) or in parallel (via a gear train), as desired. Pump 66 may also be selectively operated as a motor. More specifically, when an associated actuator is operating in an overrunning condition, the fluid discharged from the actuator may have a pressure elevated higher than an output pressure of pump 66. In this situation, the elevated pressure of the actuator fluid directed back through pump 66 may function to drive pump 66 to rotate with or without assistance from power source 18. Under some circumstances, pump 66 may even be capable of imparting energy to power source 18, thereby improving an efficiency and/or capacity of power source 18.

During some operations, it may be desirable to selectively switch a flow direction of fluid passing through a linear and/or rotary actuator without switching a rotation direction of the pump. For example, when fluid from two or more of hydraulic circuits 58, 59, 60, 61, 62, 63 is directed to a particular actuator, and the actuators of the hydraulic circuits sharing fluid are operated simultaneously, it may be necessary to change a travel direction of one of the actuators without changing a travel direction of the other actuator(s). Selectively switching the flow direction of fluid through the actuator may change the travel direction of the actuator independent of the travel direction of the other actuator(s). For these purposes, each of hydraulic circuits 58, 59, 60, 61, 62, 63 may be provided with a switching valve capable of substantially isolating the rotary actuator and/or the linear actuator from its associated pump 66 and/or other hydraulic circuit components, as well as switching the travel direction of the associated actuator. In exemplary embodiments, a switching valve 76A may be associated with hydraulic circuit 58, a switching valve 76B may be associated with hydraulic circuit 59, a switching valve 76C may be associated with hydraulic circuit 60, and a switching valve 76D may be associated with hydraulic circuit 61. Additional switching valves may be associated with hydraulic circuits 62 and 63 in further exemplary embodiments.

In an exemplary embodiment, one or more of switching valves 76A, 76B, 76C, 76D may be any type of non-variable on/off type valve. Such valves may be, for example, two-position or three-position four-way spool valves that are solenoid-actuated between one or more flow-passing positions, and are spring-biased toward a flow-blocking position. Such flow-passing positions may include, for example, a direct flow passing position and a cross-flow passing position, wherein the cross-flow passing position may direct fluid in a direction opposite or reversed from the direct flow passing position. When switching valves 76A, 76B, 76C, 76D are in one of the flow-passing positions, fluid may flow substantially unrestricted through the switching valves 76A, 76B, 76C, 76D. When switching valves 76A, 76B, 76C, 76D are in the flow-blocking position, fluid flows within first and second pump passages 68, 70 may not pass through and substantially affect the motion of the rotary actuator and/or the linear actuator. It is contemplated that switching valves 76A, 76B, 76C, 76D may also function as load-holding valves. For example, one or more of switching valves 76A, 76B, 76C, 76D may hydraulically lock movement of an associated rotary actuator and/or the linear actuator. Such hydraulic locking may occur, for example, when the associated actuators have non-zero displacement and switching valves 76A, 76B, 76C, 76D are in their flow-blocking positions. Similar functionality may also be provided by dedicated load-holding valves 114 and/or other hydraulic components associated with the various actuators shown in FIG. 2. It is understood that, due to the construction of such valves, dedicated poppet-type load holding valves 114 and the like may have superior leakage and drift characteristics than, for example, spool-type switching valves 76.

In additional exemplary embodiments, one or more of the switching valves 76A, 76B, 76C, 76D may be any type of variable position valve. For example, in embodiments in which one or more of the rotary actuators are prevented from reaching zero displacement, the associated switching valve 76B, 76C may be a variable position valve. Such variable position switching valves 76A, 76B, 76C, 76D may be, for example, four-way spool valves and/or any other like valves or group of valves configured to have the flow-passing, flow-blocking, flow-restricting, flow-switching and/or other functionality described herein. In further exemplary embodiments, one or more of the switching valves 76A, 76B, 76C, 76D may comprise four independent two-position, two-way poppet valves. Variable position switching valves may be configured to controllably vary the amount of fluid passing therethrough. For example, such valves may permit passage of any desired flow of fluid to and/or from the associated actuator. Such desired flows may vary between a substantially unrestricted flow at a fully open flow-passing position and a completely restricted flow (i.e., no flow) at a fully closed flow-blocking position. In such exemplary embodiments, the switching valves 76A, 76B, 76C, 76D may be configured to controllably vary, increase, decrease, and/or otherwise change a linear or rotational speed of the associated actuators, in addition to facilitating isolation and/or selective flow direction switching of the associated actuators. Such switching valves 76A, 76B, 76C, 76D may be configured to change the respective speeds of the associated actuators independently by restricting flow through the associated actuators. For example, during a combined flow operation, one of the pumps 66 may provide fluid to more than one actuator simultaneously. In such operations, it may be desirable to change a speed of one of the actuators without changing a speed of the remaining actuators receiving fluid from the pump 66, and a variable position switching valve 76A, 76B, 76C, 76D may be configured to independently change the speed of its associated actuator by variably restricting the flow of fluid through the actuator. Such flow and/or speed control may be useful in, for example, independently changing the translational velocity of the hydraulic cylinders 26 and/or the hydraulic cylinder 32 when the pumps 66 of hydraulic circuits 58 and 61 provide fluid to each of these actuators simultaneously. It is understood that the flow of fluid through each hydraulic circuit 58, 59, 60, 61, 62, 63 may be controlled by the associated pump 66, and as this flow passes through respective switching valves 76A, 76B, 76C, 76D, changing the conductance switching valve 76A, 76B, 76C, 76D imposes on this flow has the effect of altering the pressure difference across the switching valve 76A, 76B, 76C, 76D. Thus, for a given flow passing through switching valve 76A, 76B, 76C, 76D to a respective actuator, such a change in conductance will dictate the speed of the actuator if the pressures balance the load being applied to the actuator. Although described above with respect to the exemplary actuators of hydraulic circuits 58 and 61, variable position switching valves 76A, 76B, 76C, 76D may have similar functionality when associated with the actuators of any of circuits 58, 59, 60, 61, 62, 63.

In further exemplary embodiments, one or more of the switching valves 76A, 76B, 76C, 76D may comprise a plurality of two or three-position, non-variable, on/off type valves. In further exemplary embodiments, one or more of the switching valves 76A, 76B, 76C, 76D may comprise a plurality of variable position valves. In the exemplary embodiment of FIG. 2, switching valves 76A and 76D may comprise first, second, third, and fourth valves 78, 80, 82, 84, and one or more of the first, second, third, and fourth valves 78, 80, 82, 84 may comprise a variable position valve. The valves 78, 80, 82, 84 may be individually controlled to permit and/or restrict passage of fluid between, for example, the hydraulic cylinders 26, 32, and first and second pump passages 68, 70 of hydraulic circuits 58, 61. In exemplary embodiments, one or more of the first, second, third, and fourth valves 78, 80, 82, 84 may comprise an independent metering valve. Such first, second, third, and fourth valves 78, 80, 82, 84 may enable regeneration of an associated linear actuator, which may reduce pump flow and may thereby enable a reduction in the speed and or size of an associated pump 66. Additionally, independent flow metering via such first, second, third, and fourth valves 78, 80, 82, 84 may assist in minimizing throttling losses, thereby increasing the efficiency of the hydraulic system 54.

As shown in FIG. 2, hydraulic circuits 58, 59, 60, 61 may be selectively fluidly connected to one another via one or more combining valves. In particular, first hydraulic circuit 58 may be selectively fluidly connected to fourth hydraulic circuit 61 via a combining valve 107A, and first hydraulic circuit may be selectively fluidly connected to second hydraulic circuit 59 via a combining valve 107B. In addition, second hydraulic circuit 59 may be selectively fluidly connected to third hydraulic circuit 60 via a combining valve 107C, and third hydraulic circuit 60 may be selectively fluidly connected to fourth hydraulic circuit 61 via a combining valve 107D. Combining valves 107A, 107B, 107C, 107D may comprise one or more flow control components configured to facilitate directing fluid between the circuits 58, 59, 60, 61 and/or combining fluid from two or more sources. In an exemplary embodiment, one or more of the combining valves 107A, 107B, 107C, 107D may comprise a plurality of two or three-position, variable (proportional-type) four-way valves. In further exemplary embodiments, one or more of the combining valves 107A, 107B, 107C, 107D may comprise a plurality of variable position two-way valves similar to switching valves 76A, 76D. In still further exemplary embodiments, one or more of the combining valves, such as combining valve 107A, may comprise a two-position, non-variable four-way valve. In additional exemplary embodiments, one or more of the combining valves, such as combining valves 107B, 107C, 107D, may comprise a two-position, variable four-way valve. Similar to the switching valves 76A, 76B, 76C, 76D discussed above, one or more of the combining valves may comprise spool valves that are solenoid-actuated between one or more flow-passing positions, and are spring-biased toward a flow-blocking position. Such flow-passing positions may include, for example, the direct flow passing position and the cross-flow passing position described above.

In the exemplary embodiment of FIG. 2, combining valves 107B, 107C, 107D may be selectively fluidly connected to the first pump passage 68 and/or the second pump passage 70 of the respective hydraulic circuits 58, 59, 60, 61 via passages 108, 110. Likewise, combining valve 107A may be selectively fluidly connected to the first pump passages 68 of hydraulic circuits 58, 61 via passage 116, and may be selectively fluidly connected to the second pump passages 70 of hydraulic circuits 58, 61 via passage 118. Through the various fluid connections of the combining valves 107A, 107B, 107C, 107D, fluid may be simultaneously provided from one or more pumps 66 to any of the actuators of hydraulic system 56. The combining valves 107A, 107B, 107C, 107D may also be configured to isolate one or more of the circuits 58, 59, 60, 61 and/or components thereof.

For example, in some operations it may be desirable to supplement a flow of fluid provided to a particular actuator by a first pump 66 with a flow of fluid from a second pump 66 of a separate hydraulic circuit 58, 59, 60, 61. For these purposes, one or more of the combining valves 107A, 107B, 107C, 107D may be used to direct fluid from the pumps 66 of different respective hydraulic circuits 58, 59, 60, 61 to the actuator, thereby directing a "combined flow" of fluid to the actuator. During such combined flow operations, the actuators associated with the hydraulic circuits from which the combined flow is formed may each be operated simultaneously. With respect to, for example, hydraulic circuit 58, such a combined flow of fluid may be required when the demand of hydraulic cylinders 26 exceeds the maximum displacement of the pump 66 of hydraulic circuit 58. In such situations, the combining valve 107A may be transitioned from the flow-blocking position to the flow-passing position, thereby combining fluid pressurized by pump 66 of hydraulic circuit 61, with fluid pressurized by pump 66 of hydraulic circuit 58. As a result, the switching valve 76A will direct the combined flow of fluid to the hydraulic cylinders 26. Such a combined flow operation may be useful when, for example, hydraulic cylinders 26 and 32 are being operated simultaneously, with or without simultaneous operation of left and right travel motors 42L, 42R. However, in applications in which a combined flow is required due to the demand of hydraulic cylinders 26 exceeding the maximum displacement of pump 66 of hydraulic circuit 58, and in which left and right travel motors 42L, 42R are not operational, such a combined flow may be formed by combining fluid from one or more of hydraulic circuits 58, 59, 60, 61. When a combined flow of fluid is directed to the hydraulic cylinders 26, the switching valve 76A associated with the hydraulic cylinders 26 may be used to variably restrict flow through the hydraulic cylinders 26. Restricting flow with switching valve 76A while providing a combined flow to the hydraulic cylinders 26 may assist in controlling the speed of the hydraulic cylinders 26. It is understood that in additional exemplary embodiments, the combining valve 107A and/or the switching valve 76D may be used to variably restrict such a combined flow.

In further exemplary embodiments, switching valves 76A, 76D may be used to facilitate fluid regeneration of the associated linear actuators. For example, when valves 80, 84 are moved to their flow passing positions and valves 78, 82 are in their flow-blocking positions, high-pressure fluid may be transferred from one chamber to the other of the linear actuator via the switching valve 76 and valves 80, 84, with only the rod volume of fluid (i.e., the volume of fluid displaced by rod portion 50A) ever passing through pump 66. For example, when regenerating during extension of hydraulic cylinders 26, pump 66 of hydraulic circuit 58 may supply fluid to hydraulic cylinders 26 in the amount of the difference between the flow into first chamber 52 and the flow exiting second chamber 54. Likewise, when regenerating during retraction of hydraulic cylinders 26, pump 66 of hydraulic circuit 58 may receive excess fluid from hydraulic cylinders 26 in the amount of the difference between the flow into second chamber 54 and the flow exiting first chamber 52. Similar functionality may alternatively be achieved by moving valves 78, 82 to their flow-passing positions while holding valves 80, 84 in their flow-blocking positions.

It will be appreciated by those of skill in the art that the respective rates of hydraulic fluid flow into and out of first and second chambers 52, 54 of hydraulic cylinders 26, 32, 34 during extension and retraction may not be equal. That is, because of the location of rod portion 50A within second chamber 54, piston assembly 50 may have a reduced pressure area within second chamber 54, as compared with a pressure area within first chamber 52. Accordingly, during retraction of hydraulic cylinders 26, 32, 34, more hydraulic fluid may be forced out of first chamber 52 than can be consumed by second chamber 54 and, during extension, more hydraulic fluid may be consumed by first chamber 52 than is forced out of second chamber 54. In order to accommodate the excess fluid discharge during retraction and the additional fluid required during extension, each of hydraulic cylinders 26, 32 may be provided with two makeup valves 89 and two relief valves (not shown) that are fluidly connected to a connection 136 of the charge circuit 64 via respective connections 138, 144. Similarly, hydraulic cylinder 34 may be provided with two makeup valves 86 and two relief valves 88 that are fluidly connected to charge circuit 64 via a common passage 90.

As shown in FIG. 2, in exemplary embodiments, each of hydraulic circuits 58, 59, 60, 61, 62 may be provided with a makeup valve 86 and relief valve 88 arrangement similar to that of hydraulic circuit 63. Additionally, left travel motor 42L and right travel motor 42R may be provided with two makeup valves 89 and two relief valves 88 that are fluidly connected to the connection 136 of charge circuit 64 via respective connections 140, 142, and in still further exemplary embodiments, swing motor 43 may also be provided with such valves 88, 89 and fluid connections. It is also understood that to avoid damage to hydraulic cylinders 26, 32 and/or to otherwise dissipate energy from the pressurized fluid leaving hydraulic cylinders 26, 32, the switching valve 76A, 76D associated with each cylinder 26, 32 may be configured to variably restrict flow through and/or otherwise reduce the speed of the respective cylinder 26, 32 even during regeneration. Due to, for example, the bi-directional variable displacement nature of pump 66 associated with hydraulic circuit 63, a switching valve may not be required for use with hydraulic cylinder 34.

As shown in FIG. 2, makeup valves 89 may each be check valves or other like valves configured to restrict flow in a first direction and to only permit flow in a second direction when the flow pressure exceeds a spring bias of the valve. For example, makeup valves 89 may be configured to selectively allow pressurized fluid from charge circuit 64 to enter rod-end passage 72 and/or head-end passage 74 of hydraulic cylinders 26 via connection 138. Such valves may, however prohibit fluid from passing in the opposite direction.

Makeup valves 86, on the other hand, may each be variable position two-way spool valves disposed between common passage 90 and one of first and second pump passages 68, 70, and each may be configured to selectively allow pressurized fluid from charge circuit 64 to enter first and second pump passages 68, 70. In particular, each of makeup valves 86 may be solenoid-actuated from a first position at which fluid freely flows between common passage 90 and the respective first and second pump passage 68, 70, toward a second position at which fluid from common passage 90 may flow only into first and second pump passage 68, 70 when a pressure of common passage 90 exceeds the pressure of first and second pump passages 68, 70 by a threshold amount. Makeup valves 86 may be spring-biased toward either of the first or second positions, and only moved toward their first positions during operations known to have need of negative makeup fluid. Makeup valves 86 may also be used to facilitate fluid regeneration between first and second pump passages 68, 70 within a particular circuit, by simultaneously moving together at least partway to their first positions. In exemplary embodiments, makeup valves 86 may also assist in creating bypass flow for an "open center feel." For example, such functionality may control an associated actuator to stop when load on the actuator increases and/or when an operator provides a constant force command via interface device 46. In such exemplary embodiments, flow from pump 66 may be diverted to tank 98 during such a load increase and/or a constant force command. Such functionality may enable the operator to accomplish delicate position control tasks, such as cleaning a dirt wall with work tool 14 without breaking the dirt wall.

Relief valves described above, such as relief valves 88, may be provided to allow fluid relief from the respective actuators and from each hydraulic circuit 58, 59, 60, 61, 62, 63 into charge circuit 64 when a pressure of the fluid exceeds a set threshold of relief valves 88. Relief valves 88 may be set to operate at relatively high pressure levels in order to prevent damage to hydraulic system 56, for example at levels that may only be reached when hydraulic cylinders 26, 32, 34 reach an end-of-stroke position and the flow from the associated pumps 66 is nonzero, or during a failure condition of hydraulic system 56.

Charge circuit 64 may include at least one hydraulic source fluidly connected to common passage 90 described above. In the disclosed embodiment, charge circuit 64 has two sources, including a charge pump 94 and an accumulator 96, which may be fluidly connected to common passage 90 in parallel to provide makeup fluid to hydraulic circuits 58, 59, 60, 61, 62, 63. Charge pump 94 may embody, for example, an engine-driven, fixed or variable displacement pump configured to draw fluid from a tank 98, pressurize the fluid, and discharge the fluid into common passage 90. Accumulator 96 may embody, for example, a compressed gas, membrane/spring, or bladder type of accumulator configured to accumulate pressurized fluid from and discharge pressurized fluid into common passage 90. Excess hydraulic fluid, either from charge pump 94 or from hydraulic circuits 58, 59, 60, 61, 62, 63 (i.e., from operation of pumps 66 and/or the rotary and linear actuators) may be directed into either accumulator 96 or into tank 98 by way of a charge relief valve 100 disposed in a return passage 102. Charge relief valve 100 may be movable from a flow-blocking position toward a flow-passing position as a result of elevated fluid pressures within common passage 90 and return passage 102. A manual service valve 104 may be associated with accumulator 96 to facilitate draining of accumulator 96 to tank 98 during service of charge circuit 64.

During operation of machine 10, the operator of machine 10 may utilize interface device 46 to provide a signal that identifies a desired movement of the various linear and/or rotary actuators to a controller 124. Based upon one or more signals, including the signal from interface device 46 and, for example, signals from various pressure sensors 126 and/or position sensors (not shown) located throughout hydraulic system 56, controller 124 may command movement of the different valves and/or displacement changes of the different pumps and motors to advance a particular one or more of the linear and/or rotary actuators to a desired position in a desired manner (i.e., at a desired speed and/or with a desired force). Exemplary signals received and control signals sent by controller 124 are illustrated schematically in FIG. 2.

Controller 124 may embody a single microprocessor or multiple microprocessors that include components for controlling operations of hydraulic system 56 based on input from an operator of machine 10 and based on sensed or other known operational parameters. Numerous commercially available microprocessors can be configured to perform the functions of controller 124. It should be appreciated that controller 124 could readily be embodied in a general machine microprocessor capable of controlling numerous machine functions. Controller 124 may include a memory, a secondary storage device, a processor, and any other components for running an application. Various other circuits may be associated with controller 124 such as power supply circuitry, signal conditioning circuitry, solenoid driver circuitry, and other types of circuitry.

INDUSTRIAL APPLICABILITY

The disclosed hydraulic system 56 may be applicable to any machine where improved hydraulic efficiency and performance is desired. The disclosed hydraulic system 56 may provide for improved efficiency through the use of meterless technology, and may provide for enhanced functionality and control through the selective use of novel circuit configurations. Operation of hydraulic system 56 will now be described.

During operation of machine 10, an operator located within station 20 may command a particular motion of work tool 14 in a desired direction and at a desired velocity by way of interface device 46. One or more corresponding signals generated by interface device 46 may be provided to controller 124 indicative of the desired motion, along with machine performance information, for example sensor data such a pressure data, position data, speed data, pump displacement data, and other data known in the art.

In response to the signals from interface device 46 and based on the machine performance information, controller 124 may generate control signals directed to pumps 66 and to valves 76A, 76B, 76C, 76D, 86, 107A, 107B, 107C, 107D, 114. For example, to extend hydraulic cylinders 26, controller 124 may generate a control signal that causes pump 66 of hydraulic circuit 58 to discharge fluid into first pump passage 68. In addition, controller 124 may generate a control signal that causes switching valve 76A to move toward and/or remain in its direct or cross flow-passing position. For example, in the exemplary embodiment of FIG. 2, the control signal from controller 124 may cause valves 80, 82 to move toward and/or remain in their flow-passing positions, and may cause valves 78, 84 to move toward and/or remain in their flow-blocking positions. This configuration of switching valve 76A may permit fluid to pass from first pump passage 68 to first chamber 52 of the hydraulic cylinders 26 via head end passage 74 while permitting fluid to pass from second chamber 54 of the hydraulic cylinders 26 to second pump passage 70 via rod end passage 72. After fluid enters second pump passage 70 from switching valve 76A, the fluid may return to pump 66.

If, during movement of hydraulic cylinders 26, the pressure of fluid within either of first or second pump passages 68, 70 becomes excessive (for example during an overrunning condition), fluid may be relieved from the pressurized passage to tank 98 via relief valves 88 and common passage 90. In contrast, when the pressure of fluid within either of first or second pump passages 68, 70 becomes too low, fluid from charge circuit 64 may be allowed into hydraulic circuit 58 via common passage 90 and makeup valves 86.

To retract hydraulic cylinders 26, switching valve 76A may be controlled to reverse the direction of flow through hydraulic cylinders 26. For example, in the exemplary embodiment of FIG. 2, a control signal from controller 124 may cause valves 78, 84 to move toward and/or remain in their flow-passing positions, and may cause valves 82, 80 to move toward and/or remain in their flow-blocking positions. This configuration of switching valve 76A may permit fluid to pass from first pump passage 68 to second chamber 54 of the hydraulic cylinders 26 via rod end passage 72 while permitting fluid to pass from first chamber 52 of the hydraulic cylinders 26 to second pump passage 70 via head end passage 74. After fluid enters second pump passage 70 from switching valve 76A, the fluid may return to pump 66.

Due to the various configurations of switching valve 76A, the flow direction of fluid passing through hydraulic cylinders 26, and thus the travel direction of hydraulic cylinders 26, may be selectively and variably switched without changing the flow direction of associated pump 66. The flow direction of fluid passing through hydraulic cylinders 26 may also be selectively and variably switched independent of, for example, the flow direction of fluid passing through other actuators of hydraulic system 56. In addition, in exemplary embodiments in which the switching valve 76A comprises one or more variable position valves, flow through the hydraulic cylinders 26 may be variably restricted such that the speed of hydraulic cylinders 26 may be changed and/or otherwise controlled independent of the speed of other actuators of hydraulic system 56. Such independent direction and/or speed control may be advantageous in a variety of applications in which a combined flow is provided to hydraulic cylinders 26. For example, when fluid from one or more of hydraulic circuits 59, 60, 61 is combined with fluid from hydraulic circuit 58, such independent control may enable hydraulic cylinders 26 to be moved and/or otherwise operated simultaneously with the actuators associated with hydraulic circuits 59, 60, 61, yet at different speeds and/or in different directions than such actuators. As will be described in greater detail below, combined flow operations of hydraulic system 56 may be useful in satisfying actuator flow demands that exceed the capacity of a single pump 66.

In exemplary embodiments, combining valves 107A, 107B, 107C, 107D may enable an actuator of hydraulic system 56 to satisfy flow demands which exceed the capacity of the individual pump 66 associated with the actuator. For example, during travel operations in which left and/or right travel motors 42L, 42R are operated without operating hydraulic cylinders 26, 32, control signals from controller 124 may cause switching valves 76B, 76C to move toward and/or remain in their direct or cross flow-passing positions, and may cause switching valves 76A, 76D to move toward and/or remain in their flow-blocking positions. If pump 66 of respective hydraulic circuits 59, 60 is able to satisfy the respective flow demand of left travel motor 42L and right travel motor 42R, combining valves 107A, 107B, 107C, 107D may remain in their flow-blocking positions such that fluid is not shared between hydraulic circuits 58, 59, 60, 61. This valve configuration may permit fluid to pass from pump 66 of hydraulic circuit 59, through switching valve 76B and left travel motor 42L, and back to pump 66 of circuit 59. This valve configuration may also permit fluid to pass from pump 66 of hydraulic circuit 60, through switching valve 76C and right travel motor 42R, and back to pump 66 of circuit 60.

If, however, a flow demand of left travel motor 42L and/or right travel motor 42R exceeds a capacity of its associated pump 66, a control signal from controller 124 may cause one or more of combining valves 107A, 107B, 107C, 107D to move toward and/or remain in a flow-passing position such that a combined flow may be provided to the left travel motor 42L and/or right travel motor 42R, thereby satisfying this demand. For example, in an operation in which relatively rapid movement of machine 10 is required, such as during on-highway or off-highway travel near top speed, pump 66 of hydraulic circuit 59 may not have sufficient capacity to satisfy the demand of left travel motor 42L, and pump 66 of hydraulic circuit 60 may not have sufficient capacity to satisfy the demand of right travel motor 42R. In such an operation, combining valves 107B, 107D and switching valves 76B, 76C may be controlled to move toward and/or remain in their flow-passing positions. In this configuration, pump 66 of hydraulic circuits 58, 59 may provide a combined flow of fluid to left travel motor 42L via switching valve 76B, and pump 66 of hydraulic circuits 60, 61 may provide a combined flow of fluid to right travel motor 42R via switching valve 76C. In such a combined flow operation, if the combined capacity of pumps 66 exceeds the demand of associated left and right travel motors 42L, 42R, variable position combining valves 107B, 107D and/or variable position switching valves 76B, 76C may be controlled to restrict flow through left and/or right travel motors 42L, 42R, respectively, as desired.

It is understood that a similar flow combining operation could be facilitated by combining valves 107B, 107D to provide hydraulic cylinders 26, 32 with a combined flow of fluid in applications in which machine 10 is stationary (i.e., in applications in which movement of left and right travel motors 42L, 42R is not required). For example, if movement of left and right travel motors 42L, 42R is not required and the flow demand of hydraulic cylinders 26 exceeds the capacity of pump 66 of hydraulic circuit 58, control signals from controller 124 may cause combining valve 107B to move toward its flow-passing position while combining valves 107A, 107C, 107D are controlled to move toward and/or remain in their flow-blocking positions. In this configuration, pump 66 of hydraulic circuits 58, 59 may provide a combined flow of fluid to hydraulic cylinders 26 via combining valve 107B and switching valve 76A. Alternatively, if movement of left and right travel motors 42L, 42R is not required and the flow demand of hydraulic cylinder 32 exceeds the capacity of pump 66 of hydraulic circuit 61, control signals from controller 124 may cause combining valve 107D to move toward its flow-passing position while combining valves 107A, 107B, 107C are controlled to move toward and/or remain in their flow-blocking positions. In this configuration, pump 66 of hydraulic circuits 60, 61 may provide a combined flow of fluid to hydraulic cylinder 32 via combining valve 107D and switching valve 76D. In such combined flow operations, if the combined capacity of pumps 66 exceeds the demand of hydraulic cylinders 26 or hydraulic cylinder 32, variable position combining valves 107B, 107D and/or variable position switching valves 76A, 76D may be controlled to restrict flow through hydraulic cylinders 26 and/or hydraulic cylinder 32, respectively, as desired.

In further operations, such as excavation applications in which excessively heavy materials are being handled by machine 10 at or below grade, an operator may request simultaneous movement of hydraulic cylinders 26, 32 while machine 10 is stationary, and the flow demand on one of these actuators may exceed the combined capacity of two pumps 66. During such operations, a combined flow including fluid provided by three or four pumps 66 may be directed to the cylinders 26, 32 to satisfy the demand. For example, if movement of left and right travel motors 42L, 42R is not required and the flow demand of hydraulic cylinders 26 exceeds the combined capacity of pump 66 of hydraulic circuits 58, 59, control signals from controller 124 may cause combining valves 107B, 107C to move toward their flow-passing positions while combining valves 107A, 107D are controlled to move toward and/or remain in their flow-blocking positions. In this configuration, pump 66 of hydraulic circuits 58, 59, 60 may provide a combined flow of fluid to hydraulic cylinders 26 via combining valves 107B, 107C and switching valve 76A. In such a three-pump combined flow operation, if the combined capacity of pumps 66 exceeds the demand of hydraulic cylinders 26, variable position combining valves 107B, 107C and/or variable position switching valve 76A may be controlled to restrict flow through hydraulic cylinders 26 as desired.

In additional operations in which the combined flow provided to hydraulic cylinders 26 by pump 66 of hydraulic circuits 58, 59, 60 is still not sufficient to satisfy the flow demand of hydraulic cylinders 26, pump 66 of hydraulic circuit 61 may be utilized to augment this combined flow, while machine 10 is stationary, and while simultaneously operating hydraulic cylinder 32. For example, during such operations, control signals from controller 124 may cause combining valves 107A, 107B, 107D to move toward their flow-passing positions while combining valve 107C is controlled to move toward and/or remain in its flow-blocking position. In this configuration, pump 66 of hydraulic circuits 58, 59, 60, 61 may provide a combined flow of fluid to hydraulic cylinders 26 via combining valves 107A, 107B, 107D and switching valve 76A. In such an operation, a control signal from controller 124 may cause valves 78, 84 of switching valve 76A to move toward and/or remain in their flow-passing positions, and may cause valves 82, 80 of switching valve 76A to move toward and/or remain in their flow-blocking positions. This configuration of switching valve 76A may permit fluid to pass from first pump passage 68 to second chamber 54 of the hydraulic cylinders 26 via rod end passage 72 while permitting fluid to pass from first chamber 52 of the hydraulic cylinders 26 to second pump passage 70 via head end passage 74. In such a four-pump combined flow operation, if the combined capacity of pumps 66 exceeds the demand of hydraulic cylinders 26 during simultaneous operation of hydraulic cylinders 26, 32, variable position combining valves 107A, 107B, 107D and/or variable position switching valve 76A may be controlled to variably restrict flow through hydraulic cylinders 26 as desired. Additionally, due to the configuration of switching valves 76A, 76D, during such simultaneous combined flow operation of hydraulic cylinders 26, 32, the speed and/or direction of hydraulic cylinders 26 may be changed independent of a corresponding speed and/or direction of hydraulic cylinders 32. Moreover, during retraction of hydraulic cylinders 26, makeup valves 89 and switching valve 76A may allow some of the fluid exiting first chamber 52 to bypass pump 66 and flow directly into second chamber 54. In such operations, switching valve 76A may variably restrict flow through the hydraulic cylinders 26 as desired to reduce the speed of hydraulic cylinders 26. In particular, valves 78, 82 may be transitioned toward and/or remain in their flow-passing positions while valves 80, 84 may be transitioned toward and/or remain in their flow-blocking positions to assist in such variable flow restriction. Although the above three and four-pump control strategies are described with respect to operation of hydraulic cylinders 26, it is understood that similar control strategies may be employed to provide such a combined flow of fluid to hydraulic cylinder 34. Additionally, although the direction arrows shown with respect to unidirectional pumps 66 of FIG. 2 are indicative of an exemplary counter-clockwise flow through the respective hydraulic circuits 58, 59, 60, 61, it is understood that in additional exemplary embodiments, such unidirectional pumps 66 may be configured to direct fluid through one or more of hydraulic circuits 58, 59, 60, 61 in an exemplary clockwise direction.

In still other operations, such as an earth-moving application in which boom 22 is retracted while stick 28 is extended and while machine 10 is traveling, an operator may request simultaneous movement of left and right travel motors 42L, 42R and hydraulic cylinders 26, 32. During such an operation, control signals from controller 124 may cause switching valves 76A, 76B, 76C, 76D to move toward and/or remain in their direct or cross flow-passing positions. If pump 66 of respective hydraulic circuits 59, 60, 61, 62 is able to satisfy the respective load demand of left and right travel motors 42L, 42R and hydraulic cylinders 26, 32, combining valves 107A, 107B, 107C, 107D may remain in their flow blocking-position such that fluid is not shared between hydraulic circuits 58, 59, 60, 61. Switching valve 76A may direct fluid to pass from pump 66 of hydraulic circuit 58 to second chamber 54 of hydraulic cylinders 26, and may direct fluid to pass from first chamber 52 of hydraulic cylinders 26 back to pump 66. Simultaneously, switching valve 76D may direct fluid to pass from pump 66 of hydraulic circuit 61 to first chamber 52 of hydraulic cylinder 32, and may direct fluid to pass from second chamber 54 of hydraulic cylinder 32 back to pump 66. In addition, this valve configuration may direct fluid to pass from pump 66 of hydraulic circuit 59, through switching valve 76B and left travel motor 42L, and back to pump 66 of circuit 59. Similarly, this valve configuration may direct fluid to pass from pump 66 of hydraulic circuit 60, through switching valve 76C and right travel motor 42R, and back to pump 66 of circuit 61.

If, however, a flow demand of hydraulic cylinders 26 exceeds the capacity of pump 66 of hydraulic cylinder 58, or if a flow demand of hydraulic cylinder 32 exceeds the capacity of pump 66 of hydraulic cylinder 61, a control signal from controller 124 may cause combining valve 107A to move toward its flow-passing position, thereby combining fluid from hydraulic circuit 61 with fluid from hydraulic circuit 58. This combined flow may be directed to either hydraulic cylinders 26 or hydraulic cylinder 32, thereby satisfying the flow demand. While combining valve 107A facilitates combining fluid between hydraulic circuits 58, 61, combining valves 107B, 107C, 107D may move toward and/or remain in their flow-blocking positions. The remaining fluid from hydraulic circuits 58, 61 may be provided to the other of hydraulic cylinders 26 and hydraulic cylinder 32. In this configuration, pump 66 of hydraulic circuits 58, 61 may provide a combined flow of fluid to hydraulic cylinders 26 via combining valve 107A and switching valve 76A. In such an operation, a control signal from controller 124 may cause valves 78, 84 of switching valve 76A to move toward and/or remain in their flow-passing positions, and may cause valves 82, 80 of switching valve 76A to move toward and/or remain in their flow-blocking positions. This configuration of switching valve 76A may permit the combined flow of fluid to pass from first pump passage 68 to second chamber 54 of the hydraulic cylinders 26 via rod end passage 72 while permitting fluid to pass from first chamber 52 of the hydraulic cylinders 26 to second pump passage 70 via head end passage 74. As a result, hydraulic cylinders 26, 32, as well as left and right travel motors 42L, 42R, may be operated simultaneously while a combined flow is provided to either hydraulic cylinders 26 or hydraulic cylinder 32. In such simultaneous combined flow operations, if the combined capacity of pumps 66 exceeds the demand of hydraulic cylinders 26 or hydraulic cylinder 32, variable position combining valve 107A and/or variable position switching valves 76A, 76D may be controlled to variably restrict flow through hydraulic cylinders 26 or hydraulic cylinder 32, respectively, as desired. Additionally, due to the configuration of switching valves 76A, 76B, 76C, 76D, during such simultaneous combined flow operation of hydraulic cylinders 26, 32 and left and right travel motors 42L, 42R, the speed and/or direction of hydraulic cylinders 26 may be changed independent of a corresponding speed and/or direction of hydraulic cylinders 32.

As described above, hydraulic cylinders 26 may discharge more fluid from first chamber 52 during retracting operations than is consumed within second chamber 54, and may consume more fluid than is discharged from second chamber 54 during an extending operation. During these operations, the switching valve 76A and/or makeup valve 86 associated with hydraulic cylinders 26 may be operated to allow the excess fluid to enter and fill accumulator 96 (when the excess fluid has a sufficiently high pressure, for example during an overrunning condition) or to exit and replenish hydraulic circuit 58, thereby providing a neutral balance of fluid entering and exiting pump 66 of circuit 58.

Regeneration of fluid may be possible during retracting operations of hydraulic cylinders 26, when the pressure of fluid exiting first chamber 52 of hydraulic cylinder 32 is elevated. Regeneration of fluid may also be possible during extending operations of hydraulic cylinder 26 when the pressure in second chamber 54 is higher than the pressure in first chamber 52. Specifically, during the retracting operation described above, both of makeup valves 89 may allow some of the fluid exiting first chamber 52 to bypass pump 66 and flow directly into second chamber 54. It is understood that flow demand on pump 66 may be reduced during regeneration operations as compared to non-regeneration motion of hydraulic cylinders 26. Thus, the regeneration operations described above may help to reduce a load on pump 66, while still satisfying operator demands, thereby increasing an efficiency of machine 10. The bypassing of pumps 66 may also reduce a likelihood of pumps 66 overspeeding. In such operations, the switching valve 76A associated with hydraulic cylinders 26 may variably restrict flow through the hydraulic cylinders 26 as desired to affect the speed of hydraulic cylinders 26 during regeneration. Such a restriction may facilitate energy dissipation and improve controllability of hydraulic cylinder 26.

In the disclosed embodiments of hydraulic system 56, flows provided by pump 66 may be substantially unrestricted such that significant energy is not unnecessarily wasted in the actuation process. Thus, embodiments of the disclosure may provide improved energy usage and conservation. In addition, the meterless operation of hydraulic system 56 may, in some applications, allow for a reduction or even complete elimination of metering valves for controlling fluid flow associated with the linear and rotary actuators. This reduction may result in a less complicated and/or less expensive system.

The disclosed hydraulic system 56 may further provide for improved actuator control. In particular, when two or more pumps 66 are operated to provide a combined flow of fluid to actuators of different hydraulic circuits, thereby operating the actuators simultaneously, the switching valve associated with each actuator may selectively and independently change the speed of the associated actuator by variably restricting flow through the actuator. The switching valve associated with each actuator may also selectively and independently change the direction of flow through each actuator. Variable position switching valves may also assist in independently reducing linear actuator speed during regeneration. Such independent control of individual actuators in either isolated or fluidly connected hydraulic circuits may increase the efficiency, controllability, and functionality of the hydraulic system 56.

It will be apparent to those skilled in the art that various modifications and variations can be made to the disclosed hydraulic system. Other embodiments will be apparent to those skilled in the art from consideration of the specification and practice of the disclosed hydraulic system. It is intended that the specification and examples be considered as exemplary only, with a true scope being indicated by the following claims and their equivalents.

What is claimed is:
1. A hydraulic system, comprising:
a variable displacement first pump;
a first actuator fluidly connected to the first pump via a first closed-loop circuit;
a variable displacement second pump;
a second actuator fluidly connected to the second pump via a second closed-loop circuit;
a variable displacement third pump;
a third actuator fluidly connected to the third pump via a third closed-loop circuit;
a variable displacement fourth pump;

a fourth actuator fluidly connected to the fourth pump via a fourth closed-loop circuit;

a first combining valve configured to selectively combine fluid from the first and second circuits;

a second combining valve configured to selectively combine fluid from the second and third circuits;

a third combining valve configured to selectively combine fluid from the third and fourth circuits; and a fourth combining valve configured to selectively combine fluid from the first and fourth circuits.

2. The system of claim 1, wherein the first and fourth actuators comprise linear actuators, and wherein the second and third actuators comprise rotary actuators.

3. The system of claim 2, wherein the rotary actuators comprise fixed displacement actuators, the system further comprising first, second, third, and fourth switching valves associated with the first, second, third, and fourth actuators, respectively, and configured to selectively switch a flow direction of fluid passing through the respective actuators.

4. The system of claim 3, wherein the first and fourth switching valves comprise a plurality of variable position valves configured to reduce a speed of the first and fourth actuators, respectively, during regeneration of the respective actuators.

5. The system of claim 4, wherein the second and third switching valves comprise variable position four-way valves, and each valve of the plurality of variable position valves comprises a variable position two-way valve.

6. The system of claim 3, wherein the first, second, third, and fourth switching valves are configured to variably restrict flow through the first, second, third, and fourth actuators, respectively, while receiving a combined flow via one or more of the combining valves.

7. The system of claim 3, wherein the fourth combining valve is configured to combine fluid from the first and fourth circuits, during simultaneous operation of the first and fourth actuators, in response to a demand of the first actuator exceeding a capacity of the first pump and in response to a demand of the fourth actuator exceeding a capacity of the fourth pump.

8. The system of claim 7, wherein the first and fourth switching valves are configured to variably restrict flow through the first and fourth actuators, respectively, while fluid from the first and fourth circuits is combined via the fourth combining valve.

9. The system of claim 7, wherein the first switching valve is configured to selectively switch the flow direction of fluid passing through the first actuator independent of the flow direction of fluid passing through the fourth actuator, while fluid from the first and fourth circuits is combined via the fourth combining valve.

10. The system of claim 3, wherein the first combining valve is configured to combine fluid from the first and second circuits, during simultaneous operation of the first and forth actuators, in response to a demand of the first actuator exceeding a capacity of the first pump.

11. The system of claim 10, wherein the second combining valve is configured to combine fluid from the third circuit with fluid from the first and second circuits, during simultaneous operation of the first and forth actuators, in response to a demand of the first actuator exceeding a combined capacity of the first and second pumps.

12. The system of claim 3, wherein during simultaneous operation of the first and fourth actuators the first combining valve is configured to combine fluid from the first and second circuits, the third combining valve is configured to combine fluid from the third and fourth circuits, and the fourth combining valve is configured to combine fluid from the first and fourth circuits, in response to a demand of the first actuator exceeding a combined capacity of the first, second, and third pumps.

13. A hydraulic system, comprising:

a variable displacement first pump;

first and second linear actuators associated with a boom of a machine, the first and second linear actuators being fluidly connected to the first pump via a first closed-loop circuit;

a variable displacement second pump;

a first travel motor associated with a first traction device of the machine, the first travel motor being fluidly connected to the second pump via a second closed-loop circuit;

a variable displacement third pump;

a second travel motor associated with a second traction device of the machine, the second travel motor being fluidly connected to the third pump via a third closed-loop circuit;

a variable displacement fourth pump;

a third linear actuator associated with a machine stick, the third linear actuator being fluidly connected to the fourth pump via a fourth closed loop circuit;

a first combining valve configured to selectively combine fluid from the first and second circuits;

a second combining valve configured to selectively combine fluid from the second and third circuits;

a third combining valve configured to selectively combine fluid from the third and fourth circuits; and a fourth combining valve configured to selectively combine fluid from the first and fourth circuits, wherein the first, second, and third linear actuators are configured to operate simultaneously while fluid from the first and fourth circuits is combined.

14. The system of claim 13, further comprising a first switching valve associated with the first and second linear actuators, a second switching valve associated with the first travel motor, a third switching valve associated with the second travel motor, and a fourth switching valve associated with the third linear actuator, the first, second, third, and fourth switching valves being configured to selectively switch a flow direction of fluid passing through the respective actuators.

15. The system of claim 14, wherein the first switching valve is configured to variably restrict flow through the first and second linear actuators while the first switching valve receives a combined flow of fluid.

16. The system of claim 14, wherein during simultaneous operation of the first, second, and third linear actuators, the first combining valve is configured to combine fluid from the first and second circuits, the third combining valve is configured to combine fluid from the third and fourth circuits, and the fourth combining valve is configured to combine fluid from the first and fourth circuits, in response to a demand of the first and second linear actuators exceeding a combined capacity of the first, second, and third pumps.

17. The system of claim 16, wherein the first switching valve is configured to variably restrict flow through the first and second linear actuators while the first switching valve receives a combined flow of fluid.

18. The system of claim 17, wherein the switching valve is configured to change a speed of the first and second linear actuators, independent of a speed of the third linear actuator, while the first switching valve receives the combined flow of fluid.

19. The system of claim 14, wherein the first switching valve comprises a plurality of variable position valves configured to reduce a speed of the first and second linear actuators during regeneration of the first and second actuators.

20. The system of claim 13, further comprising
a variable displacement fifth pump,
a third rotary actuator associated with a body of the machine, the third rotary actuator being fluidly connected to the fifth pump via a fifth closed-loop circuit,
a variable displacement sixth pump, and
a fourth linear actuator associated with a work tool of the machine, the fourth linear actuator being fluidly connected to the sixth pump via a sixth closed-loop circuit.

* * * * *